United States Patent
Chen et al.

(10) Patent No.: US 9,020,349 B2
(45) Date of Patent: Apr. 28, 2015

(54) ARRANGEMENT AT A REMOTE NODE, A REMOTE NODE, A CENTRAL OFFICE AND RESPECTIVE METHODS THEREIN FOR SUPERVISION OF A WAVELENGTH DIVISION MULTIPLEXED PASSIVE OPTICAL NETWORK

(75) Inventors: Jiajia Chen, Kista (SE); Patryk Urban, Vallingby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 237 days.

(21) Appl. No.: 13/508,006

(22) PCT Filed: Mar. 28, 2012

(86) PCT No.: PCT/SE2012/050337
§ 371 (c)(1),
(2), (4) Date: May 3, 2012

(87) PCT Pub. No.: WO2013/147655
PCT Pub. Date: Oct. 3, 2013

(65) Prior Publication Data
US 2013/0259466 A1    Oct. 3, 2013

(51) Int. Cl.
*H04J 14/00* (2006.01)
*H04B 10/08* (2006.01)
(Continued)

(52) U.S. Cl.
CPC ........ *H04J 14/0291* (2013.01); *G01M 11/3127* (2013.01); *H04B 10/071* (2013.01); *H04J 14/0282* (2013.01); *G01M 11/3136* (2013.01)

(58) Field of Classification Search
USPC .......... 398/10, 17, 68, 66–67, 70–72
See application file for complete search history.

(56) References Cited

U.S. PATENT DOCUMENTS 5,521,734 A * 5/1996 Frigo ............................. 398/139
5,815,295 A * 9/1998 Darcie et al. ..................... 398/72
(Continued)

FOREIGN PATENT DOCUMENTS

EP    0 639 782 A1    2/1995
EP    2 357 737 A2    8/2011

OTHER PUBLICATIONS

Xiao Fei Cheng, Yang Jing Wen, Zhaowen Xu, Yixin Wang, Jaya Shankar Pathmasuntharam, and Ping Shum, In-Service Fault Localization in WDM Passive Optical Networks, Mar. 25, 2007, National Fiber Optic Engineers Conference, pp. 1-2.*

(Continued)

*Primary Examiner* — David Payne
*Assistant Examiner* — Pranesh Barua
(74) *Attorney, Agent, or Firm* — Myers Bigel Sibley & Sajovec, PA

(57) ABSTRACT

An arrangement at a Remote Node, a Remote Node, a Central Office, a WDM-PON and a method in an arrangement at a Remote Node, and a method in a Central Office are provided for supervision of the WDM-PON. The arrangement comprises at least one filter connected to the feeder fiber links and adapted to separate a data signal and an original OTDR signal received on either of the feeder fiber links. Further, the arrangement comprises a first splitter adapted to receive, from the at least one filter, the original OTDR signal, to split the original OTDR signal into a plurality of OTDR sub-signals and to output, to an N*M AWG, the plurality of OTDR sub-signals. The at least one filter is further adapted to output the original OTDR signal to the first splitter and to output the data signal to the AWG, thereby enabling supervision of the WDM-PON.

26 Claims, 7 Drawing Sheets

(51) Int. Cl.
  *H04B 17/00* (2006.01)
  *H04J 14/02* (2006.01)
  *G01M 11/00* (2006.01)
  *H04B 10/071* (2013.01)

(56) References Cited

U.S. PATENT DOCUMENTS

| | | | |
|---|---|---|---|
| 5,907,417 A * | 5/1999 | Darcie et al. | 398/20 |
| 6,534,997 B1 * | 3/2003 | Horishita et al. | 324/534 |
| 7,042,559 B1 * | 5/2006 | Frigo et al. | 356/73.1 |
| 8,693,866 B1 * | 4/2014 | Lam et al. | 398/21 |
| 2002/0075534 A1 * | 6/2002 | Feldman | 359/110 |
| 2003/0170020 A1 * | 9/2003 | Chaudhuri et al. | 398/5 |
| 2005/0141892 A1 * | 6/2005 | Park et al. | 398/71 |
| 2005/0147412 A1 * | 7/2005 | Park et al. | 398/72 |
| 2006/0115270 A1 * | 6/2006 | Kim et al. | 398/71 |
| 2006/0153567 A1 * | 7/2006 | Kim et al. | 398/72 |
| 2006/0165412 A1 * | 7/2006 | Jung et al. | 398/71 |
| 2008/0031624 A1 * | 2/2008 | Smith et al. | 398/71 |
| 2008/0031625 A1 * | 2/2008 | Okuda et al. | 398/71 |
| 2008/0304823 A1 * | 12/2008 | Mahony et al. | 398/13 |
| 2009/0263122 A1 * | 10/2009 | Helkey et al. | 398/7 |
| 2009/0263123 A1 * | 10/2009 | Zhu et al. | 398/16 |
| 2009/0290866 A1 * | 11/2009 | Chung et al. | 398/5 |
| 2009/0290875 A1 * | 11/2009 | Xu et al. | 398/66 |
| 2010/0316372 A1 * | 12/2010 | Chang et al. | 398/12 |
| 2011/0038629 A1 * | 2/2011 | Johansson et al. | 398/58 |
| 2011/0110662 A1 * | 5/2011 | Wellbrock et al. | 398/45 |
| 2011/0255860 A1 * | 10/2011 | Lee et al. | 398/12 |
| 2011/0293278 A1 * | 12/2011 | Mazed | 398/67 |
| 2012/0251108 A1 * | 10/2012 | Chen et al. | 398/49 |
| 2013/0044368 A1 * | 2/2013 | Xu et al. | 359/341.1 |
| 2013/0148109 A1 * | 6/2013 | Bei et al. | 356/73.1 |
| 2013/0148956 A1 * | 6/2013 | Khotimsky et al. | 398/2 |
| 2013/0223841 A1 * | 8/2013 | Lee | 398/72 |

OTHER PUBLICATIONS

International Search Report Corresponding to International Application No. PCT/SE2012/050337; Date of Mailing: Dec. 19, 2012; 4 Pages.

Cheng et al., "In-Service Fault Localization in WDM Passive Optical Networks", Optical Fiber Communication (OFC 2007), Collocated National Fiber Optic Engineers Conference, Anaheim, California, Mar. 25-29, 2007, IEEE Service Center, Piscataway, New Jersey, Mar. 1, 2007, pp. 1-3.

Lee et al., "Protection Architecture for Colorless DWDM Passive Optical Networks", Photonicsglobalsigmaingapore, 2008. IPGC, 2008. IEEE, IEEE, Piscataway, New Jersey, Dec. 8, 2008, pp. 1-4.

Rad et al., "Passive optical network monitoring: challenges and requirements", IEEE Communications Magazine, IEEE Service Center, Piscataway, New Jersey, vol. 49, No. 2, Feb. 1, 2011, pp. S45-S52.

Notification of Transmittal of the International Preliminary Report on Patentability in corresponding PCT Application No. PCT/SE2012/050337; Date of Mailing: Jun. 5, 2014; 9 Pages.

* cited by examiner

ARRANGEMENT AT A REMOTE NODE, A REMOTE NODE, A CENTRAL OFFICE AND RESPECTIVE METHODS THEREIN FOR SUPERVISION OF A WAVELENGTH DIVISION MULTIPLEXED PASSIVE OPTICAL NETWORK

CROSS-REFERENCE TO RELATED APPLICATION

This application is a 35 U.S.C. §371 national stage application of PCT International Application No. PCT/SE2012/050337, filed on 28 Mar. 2012, the disclosure of which is incorporated by reference herein in its entirety.

TECHNICAL FIELD

The present disclosure relates to Wavelength Division Multiplexed Passive Optical Networks, WDM-PONs, and in particular to supervision of WDM-PONs.

BACKGROUND

Due to the trend towards higher bandwidth demand and advances in the Wavelength Division Multiplexing, WDM, device technology, the WDM Passive Optical Network, PON, is considered as a possible candidate for next-generation broadband access networks. In addition, the growing popularity of mobile data services is also places increasing demands on backhaul. WDM-PON is able to provide symmetrical ultra-high bandwidth to radio base stations and hence can easily address the growing bandwidth needs of mobile backhaul. On the other hand, to shorten the service provision down-time caused by a fibre-failure in a PON, an effective monitoring solution should be applied enabling fault detection and localization. Rapid troubleshooting becomes very important in mobile backhaul systems which support large amount of traffic to/from thousands of users. Centralized and automatic monitoring contributes to operational expenditures (OPEX) savings thanks to remote operation. No hardware upgrade on user side should be required (e.g. demarcation components) due to high hardware and manpower costs per drop link and PON monitoring functionality should be shared over the complete PON system to provide high sharing factor of the investment. Furthermore, the effective fibre-fault detection and localisation scheme should not affect data communication and be sensitive to as low power fluctuations as 1 dB.

Furthermore, operators need to guarantee the level of connection availability specified in the Service Level Agreement, SLA, in particular for business users and mobile backhauling. Protection mechanisms need to be provided in PONs to offer an acceptable reliability level. However, compared with core networks, access networks are very cost-sensitive due to the relatively low sharing factor for the cost associated with the deployment, management and technology upgrade. Therefore, it is important in PON deployment to minimise the cost of protection while maintaining the connection availability at an acceptable level. Furthermore, in order to reduce the affected number of users by single fault which has occurred in fibre access networks, the protection up to Remote Node, RN, needs to be provided in the first place, in particular in a large city with more than one million inhabitants. Due to the ultra dense population in the large city, for the most of access networks the required distance between RN and end user (i.e. the length of drop fibre, DF) is rather short. For instance, in Munich, Germany, the estimated average length of DF per user is less than 1 km (including suburban part). From the reliability point of view, the protection of the feeder fibre might be sufficient for the most cases.

SUMMARY

The object is to obviate at least some of the problems outlined above. In particular, it is an object to provide an arrangement at a Remote Node in a Wavelength Division Multiplexed Passive Optical Network, WDM-PON, a Remote Node in a WDM-PON, a Central Office in a WDM-PON and methods therein for supervision of the WDM-PON as well as a WDM-PON comprising a Remote Node and a Central Office as above, wherein the Central Office and the Remote Node are connected via two individual feeder fibre links, one working feeder fibre link and one protection feeder fibre link, having different geographical paths between the Central Office and the Remote Node. These objects and others may be obtained by providing an arrangement at a Remote Node, a Remote Node, a Central Office, a WDM-PON and a method in an arrangement at a Remote Node, and a method in a Central Office according to the independent claims attached below.

According to an aspect an arrangement at a Remote Node in a Wavelength Division Multiplexed Passive Optical Network, WDM-PON, configured for supervision of the WDM-PON is provided, wherein the Remote Node is connected to a Central Office by two individual feeder fibre links. The arrangement comprises at least one filter connected to the feeder fibre links and adapted to separate a data signal and an original Optical Time Domain Reflectometry, OTDR, signal received on either of the feeder fibre links. Further, the arrangement comprises a first splitter adapted to receive, from the at least one filter, the original OTDR signal, to split the original OTDR signal into a plurality of OTDR sub-signals and to output, to an N*M Arrayed Waveguide Grating, AWG, the plurality of OTDR sub-signals. The at least one filter further is adapted to output the original OTDR signal to the first splitter and to output the data signal to the AWG thereby enabling supervision of the WDM-PON without influencing the data signals.

According to an aspect, a Remote Node in a WDM-PON for supervision of the WDM-PON is provided, wherein the Remote Node is connected to a Central Office by two individual feeder fibre links. The Remote Node comprises an arrangement according to the aspect above and an N*M AWG, wherein N individual inputs of the AWG are connected to the arrangement such that the output of each of the at least one filter is connected to an input of the AWG and the outputs of the first splitter are connected to individual inputs of the AWG.

According to still an aspect, a Central Office in a WDM-PON for supervision of the WDM-PON is provided, wherein the Central Office is connected to a Remote Node by two individual feeder fibre links, one working feeder fibre link and one protection feeder fibre link. The Central Office comprises at least one Optical Line Terminal, OLT, adapted to output data signals and an OTDR device adapted to output OTDR signals. The Central Office further comprises at least one filter adapted to receive data signals from the OLT and OTDR signals from the OTDR device and to multiplex the signals together and output the multiplexed signals towards the working feeder fibre link towards the Remote Node. The OTDR device is adapted to detect malfunction of the working feeder fibre link, wherein the Central Office is adapted to switch feeder fibre link so that the multiplexed signals are outputted on the protection feeder fibre link.

According to yet an aspect, a WDM-PON is provided. The WDM-PON comprises a Central Office and a Remote Node according to the respective aspects above, wherein the Central Office and the Remote Node are connected via two individual feeder fibre links, one working feeder fibre link and one protection feeder fibre link, having different geographical paths between the Central Office and the Remote Node.

According to an aspect, a method in an arrangement at a Remote Node in a WDM-PON for supervision of the WDM-PON is provided, wherein the Remote Node is connected to a Central Office by two individual feeder fibre links. The method comprises separating, in at least one filter connected to the feeder fibre links, a data signal and an original OTDR signal received on either of the feeder fibre links. The method also comprises receiving at a first splitter from the at least one filter, the original OTDR signal, and splitting the original OTDR signal into a plurality of OTDR sub-signals and outputting, to an N*M AWG the plurality of OTDR sub-signals. The at least one filter outputs the original OTDR signal to the first splitter and outputs the data signal to the AWG, thereby enabling supervision of the WDM-PON without influencing the data signals.

According to an aspect, a method in a Central Office in a WDM-PON for supervision of the WDM-PON is provided, wherein the Central Office is connected to a Remote Node by two individual feeder fibre links, one working feeder fibre link and one protection feeder fibre link. The method comprises outputting data signals from at least one OLT and outputting OTDR signals from an OTDR device. The method further comprises receiving, in at least one filter, the data signals from the OLT and the OTDR signals from the OTDR device and to multiplexing the signals together and outputting the multiplexed signals to the working feeder fibre link towards the RN. A malfunction of the working feeder fibre link is detected at the OTDR device, wherein the Central Office switches feeder fibre link so that the multiplexed signals are outputted on the protection feeder fibre link.

The arrangement at the Remote Node, the Remote Node, the Central Office, the WDM-PON and the method in the arrangement at the Remote Node, and the method in the Central Office have several advantages. They allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

BRIEF DESCRIPTION OF DRAWINGS

Embodiments will now be described in more detail in relation to the accompanying drawings, in which.

DETAILED DESCRIPTION

Figure 1:
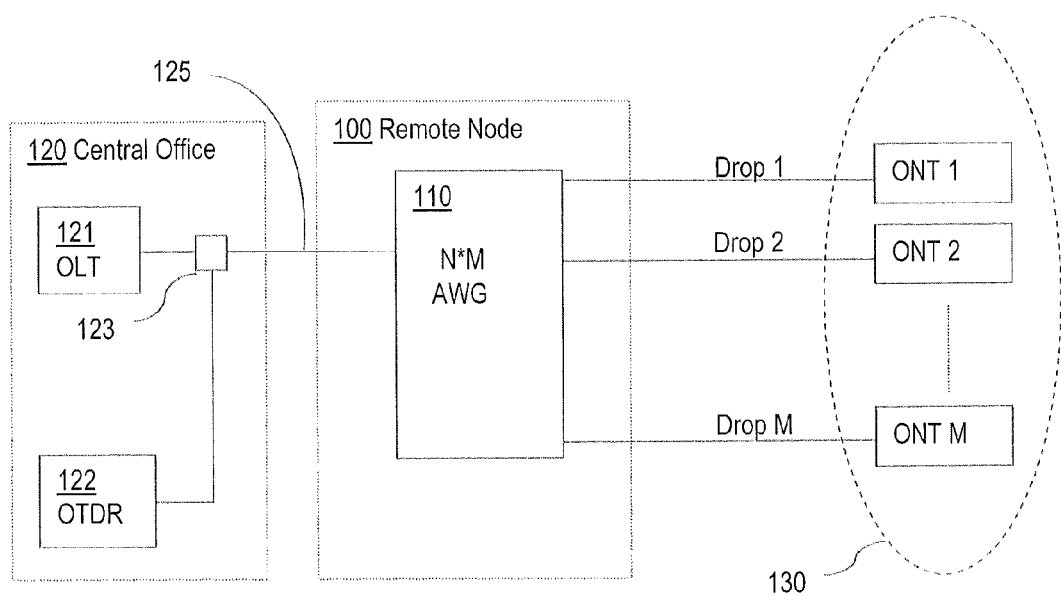
FIG. 1 is a schematic overview of an exemplifying network architecture of a WDM-PON.

Briefly described, exemplifying embodiments of an arrangement at a Remote Node, a Remote Node, a Central Office and respective methods therein as well as a Wavelength Division Multiplexed Passive Optical Network, WDM-PON, are provided for supervision of the WDM-PON, wherein the Remote Node is connected to a Central Office by two individual feeder fibre links. In normal operation, the Central Office and the Remote Node employs one of the feeder fibre links, referred to as the working feeder fibre link, for communication between the Central Office and the Remote Node. In case a malfunction of the feeder fibre link is detected at the Central Office, the Central Office switches to use the second feeder fibre link, referred to as the protection feeder fibre link, for communication between the Central Office and the Remote Node.

FIG. 1a is a schematic overview of an exemplifying network architecture of a WDM-PON. Generally, in a WDM-PON, a Central Office, CO, 120 is connected to a Remote Node, RN, 100. The CO 120 is connected to the RN 100a via a fibre link 125 which is generally referred to as a feeder fibre link. The CO 120 comprises an Optical Line Terminal, OLT, 121 which transmits data signals towards Optical Network Terminations, ONTs, 130. When the OLT 121 transmits a data signal towards one of the ONTs 130, the OLT 121 generates the data signal and injects the data signal into the feeder fibre link 125 to the RN 100.

A WDM-PON generally comprises a system for supervision of the WDM-PON which comprises an OTDR device 122. Generally in a WDM-PON, the OTDR device 122 is comprised in the CO 120. The OTDR device 122 is adapted to generate OTDR signals of different wavelengths, wherein one OTDR signal has one specific wavelength. The OTDR device 122 transmits the generated OTDR signals to a filter 123. The filter 123 also receives the data signals from the OLT 121 and multiplexes the signals together and injects, or transmits, the multiplexed signals to the RN 100 for forwarding to one or more of the ONTs 130. It shall be pointed out that a feeder fibre generally carries data signals. The OTDR may, in alternative solutions, be connected by separate fibre link between the CO 120 and the RN 100. However, in such solutions, the separate fibre link carrying only OTDR signals is not a feeder fibre link.

It shall further be pointed out that the possible wavelengths of the OTDR signals are different from the possible wavelengths of the data signals. In one example, the wavelengths of the OTDR signals are within a specified or predetermined range, or bandwidth, and the wavelengths of the data signals are within a different specified or predetermined range, or bandwidth. The two different bandwidths or ranges are spaced apart wavelength-wise such that they do not overlap. For example, the two bandwidths are spaced apart wavelength-wise by a multiple of a Free Spectral Range, FSR. For Example, with 32 individual ONTs connected to the RN, the data signal may comprise up to 32 wavelengths, $\lambda_1, \lambda_2, \ldots \lambda_{32}$, and the OTDR signal has a wavelength of $\lambda_1^i + n^*FSR$, where FSR is a Free Spectral Range of the AWG, i is an integer from 1 to 32 and n is an integer value.

According to an exemplifying embodiment of a WDM-PON, the CO and the RN are connected by two individual feeder fibre links, which have different geographical paths between the CO and the RN. The two feeder fibre links are referred to as a working feeder fibre link and a protection feeder fibre link. In normal operation of the WDM-PON, the CO employs the working feeder fibre link for transmitting data signals multiplexed with OTDR signals to the RN. In case a malfunction of the working feeder fibre link occurs and is detected at the CO, the CO switches to start using the protection feeder fibre link for transmitting data signals multiplexed with OTDR signals to the RN.

An exemplifying embodiment of an arrangement at a RN in a WDM-PON, configured for supervision of the WDM-PON wherein the RN is connected to a CO by two individual feeder fibre links, will now be described with reference to FIGS. 2 and 3.

Figure 2:
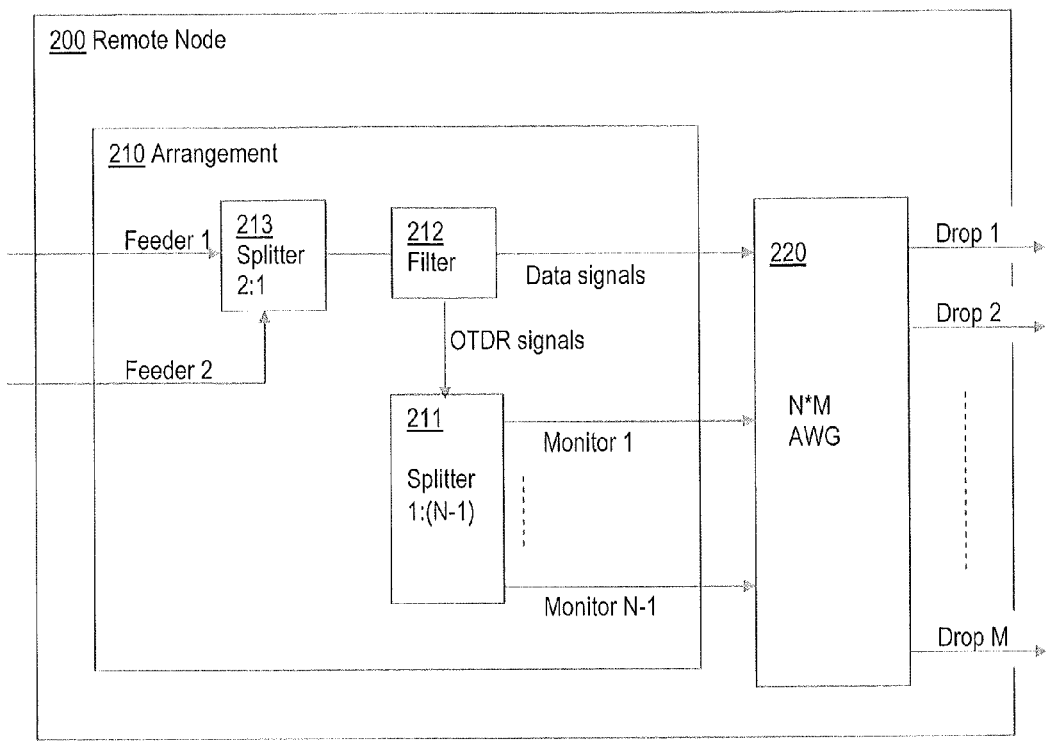
FIG. 2 is a block diagram of an exemplifying embodiment of an arrangement at a RN for supervision of the WDM-PON wherein the RN is connected to a CO by two individual feeder fibre links.
Figure 3:
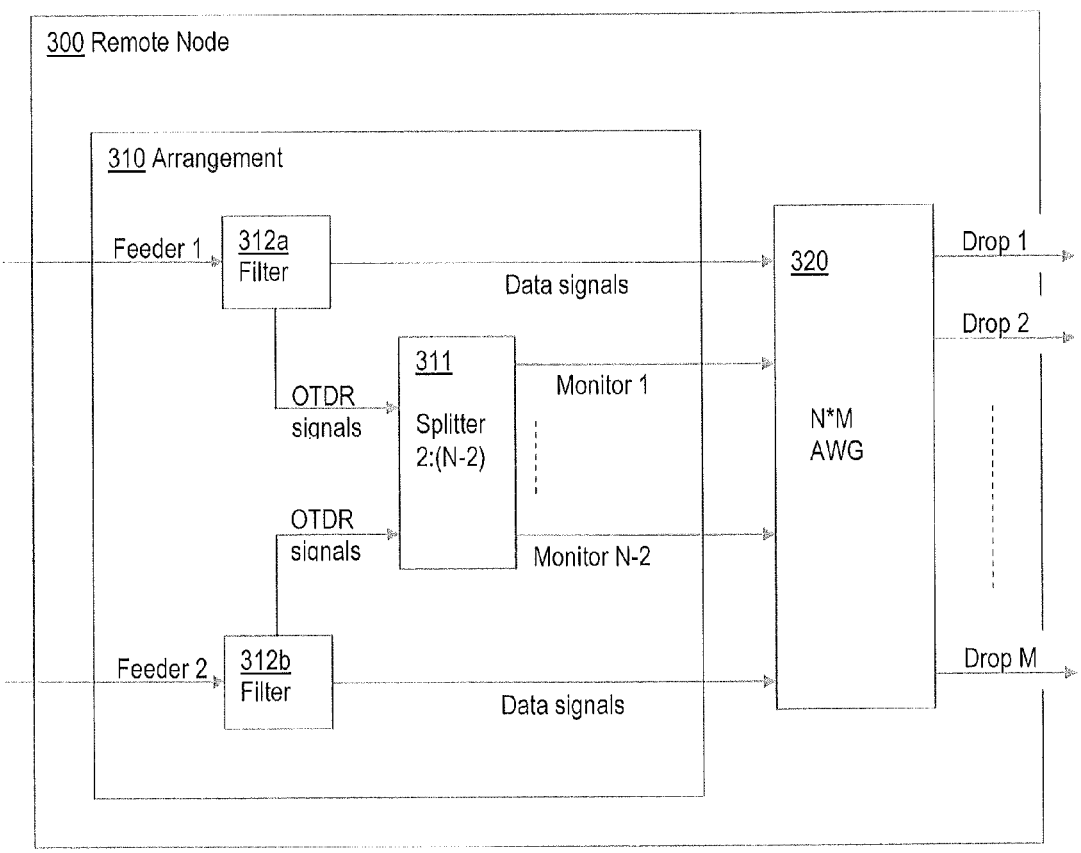
FIG. 3 is a block diagram of an exemplifying embodiment of an arrangement at a RN for supervision of the WDM-PON wherein the RN is connected to a CO by two individual feeder fibre links.

FIGS. 2 and 3 are block diagrams of two exemplifying embodiments of an arrangement at a Remote Node for supervision of the WDM-PON wherein the RN is connected to a CO by two individual feeder fibre links.

Both FIGS. 2 and 3 discloses the arrangement 210, 310 comprising at least one filter 212, 312a, 312b connected to the feeder fibre links and adapted to separate a data signal and an original Optical Time Domain Reflectometry, OTDR, signal received on either of the feeder fibre links. Further, the arrangement 210, 310 comprises a first splitter 211, 311 adapted to receive, from the at least one filter 212, 312a, 312b, the original OTDR signal, to split the original OTDR signal into a plurality of OTDR sub-signals and to output, to an N*M Arrayed Waveguide Grating 220, 320, AWG, the plurality of OTDR sub-signals. The at least one filter 212, 312a, 312b is further adapted to output the original OTDR signal to the first splitter 211, 311 and to output the data signal to the AWG 220, 320, thereby enabling supervision of the WDM-PON without influencing the data signals.

Starting with FIG. 2, the arrangement 210 comprises at least one filter 212 which is connected to the feeder fibre links, Feeder 1 and Feeder 2, and adapted to separate a data signal and an original OTDR signal received on either of the feeder fibre links, the data signal and the original OTDR signal being multiplexed together when received by the filter 212. As can be seen in FIG. 2, there are two feeder fibre links, Feeder 1 and Feeder 2, connected to the arrangement 210. The filter 212 receives a multiplexed signal which comprises a data signal and an OTDR signal. The filter 212 is adapted to separate the OTDR signal and the data signal and to output the OTDR signal to the first splitter 211. The first splitter 211 has N−1 outputs. The first splitter 211 receives the OTDR signal and splits the OTDR signal into N−1 OTDR sub-signals. The OTDR sub-signals have the same wavelength as the original OTDR signal which inputted into the first splitter, but the amplitude or optical power of the OTDR sub-signals is (N−1):th of the original OTDR signal. Merely as an example, assume that N=9, then the amplitude or optical power of the OTDR sub-signals is 1/(9−1)=⅛ of the amplitude or optical power of the original OTDR signal. The first splitter 211 is further adapted to output the N−1 OTDR sub-signals to the N*M AWG 220. The at least one filter 212, which is adapted to separate the received multiplexed signal, is further adapted to output the data signal to the AWG 220. The AWG 220 receives the data signal and the OTDR sub-signals and forwards the signals to appropriate ONTs depending on the wavelengths of the data signal and the OTDR sub-signals. The ONTs are connected to the RN by individual fibre links which are also referred to as drop links. In FIG. 2 this is illustrates as Drop 1, Drop 2, . . . , Drop M.

It shall be pointed out that the data signal may comprises up to M different wavelengths, wherein in each wavelength is dedicated a specific ONT. In this manner, the data signal may comprise up to M individual signals, one signal for each ONT.

The N−1 OTDR sub-signals will travel down in a respective drop link and due to Rayleigh scattering, portions of the OTDR sub-signals will back scatter towards the CO and the OTDR device. The back scattered light at the OTDR device is referred to as a trace, which may then be analysed to identify and analyse a possible fault which has occurred on one or more of the drop links between the RN and the ONTs. By one single OTDR wavelength, N−1 individual drop links may be supervised or monitored due to the splitting of the original OTDR signal into the N−1 OTDR sub-signals.

Looking at FIG. 3, the arrangement 310 comprises at least one filter 312a, 312b connected to the feeder fibre links, Feeder 1 and Feeder 2. The at least one filter 312a, 312b is adapted to separate a data signal and an original OTDR signal received on either of the feeder fibre links. As can be seen in FIG. 3, there are two feeder fibre links, Feeder 1 and Feeder 2, connected to the arrangement 310. The filter 312a, 312b receives a multiplexed signal which comprises a data signal and an OTDR signal. The filter 312a, 312b is adapted to separate the OTDR signal and the data signal and to output the OTDR signal to the first splitter 311. The first splitter 311 has N−2 outputs. The first splitter 311 receives the OTDR signal and splits the OTDR signal into N−2 OTDR sub-signals. The OTDR sub-signals have the same wavelength as the original OTDR signal which is inputted into the first splitter, but the amplitude or optical power of the OTDR sub-signals is (N−2):th of the original OTDR signal. Merely as an example, assume that N=10, then the amplitude or optical power of the OTDR sub-signals is 1/(10−2)=⅛ of the amplitude or optical power of the original OTDR signal. The first splitter 311 is further adapted to output the N−2 OTDR sub-signals to the N*M AWG 320. The at least one filter 312a, 312b, which is adapted to separate the received multiplexed signal, is further adapted to output the data signal to the AWG 320. The AWG 320 receives the data signal and the OTDR sub-signals and forwards the signals to appropriate ONTs depending on the wavelengths of the data signal and the OTDR sub-signals. The ONTs are connected to the RN by individual fibre links which are also referred to as drop links. In FIG. 3 this is illustrates as Drop 1, Drop 2, . . . , Drop M.

The N−2 OTDR sub-signals will travel down in a respective drop link and due to Rayleigh scattering, portions of the OTDR sub-signals will back scatter towards the CO and the OTDR device. The back scattered light at the OTDR device is referred to as a trace, which may then be analysed to identify and analyse a possible fault which has occurred on one or more of the drop links between the RN and the ONTs. By one single OTDR wavelength, N−2 individual drop links may be supervised or monitored due to the splitting of the original OTDR signal into the N−2 OTDR sub-signals.

It shall be pointed out that the data signal may comprises up to M different wavelengths, wherein in each wavelength is dedicated a specific ONT. In this manner, the data signal may comprise up to M individual signals, one signal for each ONT.

The arrangement has several advantages. The arrangement allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

In an example, wherein the arrangement comprises one filter 212, the arrangement 210 further comprises a second splitter 213 with two inputs connected to the two feeder fibre links respectively for receiving the data signal and the OTDR signal on either of the feeder fibre links and an output for outputting the received data signal and the OTDR signal to the filter 212.

Looking at FIG. 2, the arrangement 210 comprises one filter 212 as described above. The arrangement 210 in this example further comprises a second splitter 213. The second splitter has two inputs and each input is connected to an individual feeder fibre link. The arrangement 210 receives the multiplexed signal or signals on one of the feeder fibre links, illustrated in FIG. 2 as Feeder 1 and Feeder 2. The second splitter 213 does not need to know on which feeder fibre link the multiplexed signal is received since the second splitter 213 will forward the received multiplexed signal to the filter 212 in order for the filter 212 to separate the data signal and the original OTDR signal. The CO will employ one of the feeder fibre links as the working feeder fibre link and the other feeder fibre link; the protective feeder fibre link will not be used in normal operation. Only in case the CO detects a malfunction of the working feeder fibre link, the CO will switch to use the protection feeder fibre link. But as can be seen in FIG. 2, the second splitter 213 of the arrangement 210 does not need to know which feeder fibre is the working feeder fibre link and which is the protective feeder fibre link.

In an example, the first splitter 211 is adapted to split the received OTDR signal into N−1 OTDR sub-signals and to output the N−1 OTDR sub-signals to the AWG 220 on respective N−1 connections between the first splitter 211 and the AWG 220.

Again looking at FIG. 2, the AWG has N inputs and M outputs. Since there is only one filter 212 in this example which outputs a received data signal to the AWG, there are N−1 inputs which may be used for OTDR sub-signals. Therefore, the first splitter 211 splits a received original OTDR signal into N−1 OTDR sub-signals and outputs the N−1 OTDR sub-signals to respective N−1 inputs of the AWG 220. The inputs of the AWG 220 are also referred to as monitoring ports.

According to another example, the arrangement comprises two filters 312a, 312b, wherein each of the two filters is connected to an individual respective feeder fibre link, wherein the first splitter 311 is further adapted to receive the original OTDR signal from either of the two filters 312a, 312b and to output N−2 OTDR sub-signals, to the N*M AWG 320.

Looking at FIG. 3, the arrangement 310 comprises two filters 312a and filters 312b. The arrangement 310 in this example also has two feeder fibre links, Feeder 1 and Feeder 2 connected to it. One of the feeder fibre links, Feeder 1, is connected to one of the filters 312a, and the other feeder fibre link, Feeder 2, is connected to the other filter 312b. Both filters 312a and 312b are adapted to receive a multiplexed signal comprising both a data signal and an original OTDR signal. Both filters 312a and 312b are adapted to separate the data signal and the original OTDR signal and to output the data signal to an N*M AWG 320 and to output the original OTDR signal the first splitter 311. In other words, the filters 312a and 312b have the same functionality as filter 212 described in conjunction with FIG. 2. The first splitter 311 is further adapted to receive the original OTDR signal from either of the two filters 312a, 312b, to split the original OTDR signal into N−2 OTDR sub-signals and to output the N−2 OTDR sub-signals, to the N*M AWG 320. Also in this example, the arrangement 310 does not need to know on which feeder fibre link the multiplexed signal is received since both filters 312a and 312b will separate the data signal and the original OTDR signal. The CO will employ one of the feeder fibre links as the working feeder fibre link and the other feeder fibre link; the protective feeder fibre link will not be used in normal operation. Only in case the CO detects a malfunction of the working feeder fibre link, the CO will switch to use the protection feeder fibre link. But as can be seen in FIG. 3, irrespective of which feeder fibre link the multiplexed signal is received on, the multiplexed signal will be separated, the data signal will be forwarded to the AWG 320 and the original OTDR signal will be splitted into N−2 OTDR signals which will be forwarded to the AWG 320. The inputs of the AWG 320 are also referred to as monitoring ports.

In an example, wherein arrangement comprises two filters 312a and 312b, each of the two filters 312a and 312b is adapted to output the data signal on an individual and respective connection to the AWG 320.

In yet an example, the first splitter 211, 311 is further adapted to split the received original OTDR signal to eight outputs of the first splitter 211, 311.

In other words, the first splitter 211, 311 receives the original OTDR signal from the filter 212, 312a or 312b and splits it into 8 OTDR sub-signals and outputs each of the 8 OTDR sub-signals on 8 individual outputs of the first splitter 211, 311 to be inputted on 8 inputs of the AWG 220, 330. As described above, the 8 OTDR sub-signals have the same wavelength but a reduced amplitude or power. By these 8 OTDR sub-signals, it is possible to supervise or monitor 8 individual drop links connecting the RN with 8 ONTs.

Embodiments herein also relate to a RN in a WDM-PON, for supervision of the WDM-PON, wherein the RN is connected to a CO by two individual feeder fibre links.

The RN comprises an arrangement 210, 310 according to any of the examples described above and an N*M AWG 220, 320, wherein N individual inputs of the AWG 220, 320 are connected to the arrangement 210, 310 such that the output of each of the at least one filter 212, 312a, 312b is connected to an input of the AWG 220, 320 and the outputs of the first splitter 211, 311 are connected to individual inputs of the AWG 220, 320.

Looking at FIG. 2, the arrangement 210 is illustrated being comprised in the RN 200. The arrangement comprises as least one filter 212 which separates the data signal and the original OTDR signal as described above. The data signal is outputted from the filter 212 to one input of the AWG 220. The splitter 211 receives the original OTDR signal, splits it into N−1 OTDR sub-signals and outputs the N−1 OTDR sub-signals to respective N−1 inputs, or monitoring ports, of the AWG 220. Thereby, the arrangement 210 has a total of N outputs connected to N respective inputs of the N*M AWG 220.

Looking at FIG. 3, the arrangement 310 is illustrates being comprised in the RN 300. The arrangement comprises two filters 312a, 312b which separate the data signal and the original OTDR signal as described above. The data signal is outputted from the either of the filters 312a, 312b to respective inputs of the AWG 320. The splitter 311 receives the original OTDR signal, splits it into N−2 OTDR sub-signals and outputs the N−2 OTDR sub-signals to respective N−2 inputs of the AWG 320. Thereby, the arrangement 310 has a total of N outputs connected to N respective inputs of the N*M AWG 320. Since there are two filters 312a and 312b in this example, two of the N outputs from the arrangement 310 are dedicated for data signals and N−2 outputs from the arrangement 310 are dedicated for monitoring, or OTDR sub-signals.

The RN comprising the arrangement has the same advantages as the arrangement itself. The RN allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

In an example, the arrangement 210 comprises one filter 212 which has an output connected to an input to the AWG 220 and the first splitter 211 has N−1 outputs connected to a respective input of the N*M AWG 220.

In an example when the arrangement 210 comprises one filter 212, N=9 and M=32.

In other words, the arrangement 210 has 9 outputs, one output is dedicated for data signals and 8 outputs are dedicated for monitoring, or OTDR sub-signals. In this manner, 8 individual drop links may be monitored or supervised using one OTDR signal of a specific wavelength. The AWG 220 has 32 outputs, which implies that the AWG 220, and hence the RN 200, may have up to 32 ONTs connected to it. Since one OTDR wavelength may be used to monitor or supervise 8 ONTs, only 4 different wavelengths of the OTDR signal are required to supervise the 32 ONTs.

In another example, the arrangement 310 comprises two filters 312a, 312b which have a respective output connected to a respective input to the AWG 320 and the first splitter 311 has N−2 outputs connected to a respective input of the N*M AWG 320.

In an example when the arrangement 310 comprises two filters 312a, 312b, N=10 and M=32.

The arrangement 310 in this example comprises 10 outputs, whereof 2 outputs are dedicated for data signals and 8 outputs are dedicated for monitoring, or OTDR sub-signals. In this manner, 8 individual drop links may be monitored or supervised using one OTDR signal of a specific wavelength. The AWG 320 has 32 outputs, which implies that the AWG 320, and hence the RN 300, may have up to 32 ONTs connected to it. Since one OTDR wavelength may be used to monitor or supervise 8 ONTs, only four different wavelengths of the OTDR signal are required to supervise the 32 ONTs.

Embodiments herein also relate to a CO in a WDM-PON for supervision of the WDM-PON, wherein the CO is connected to a RN by two individual feeder fibre links, one working feeder fibre link and one protection feeder fibre link.

Exemplifying embodiments of such a CO will now be described with reference to FIGS. 4 and 5 which are block diagrams of exemplifying embodiments of a CO for supervision of the WDM-PON wherein the CO is connected to a RN by two individual feeder fibre links.

According to an exemplifying embodiment, the CO 400, 500 comprises at least one Optical Line Terminal, OLT, 401a, 401b, 501 adapted to output data signals and an OTDR device 420, 520 adapted to output OTDR signals. The CO 400, 500 further comprises at least one filter 410a, 410b, 510 adapted to receive data signals from the OLT 401a, 401b, 501 and OTDR signals from the OTDR device 420, 520 and to multiplex the signals together and output the multiplexed signals towards the working feeder fibre link towards the Remote Node 200, 300. The OTDR device 420, 520 is adapted to detect malfunction of the working feeder fibre link, wherein the Central Office is adapted to switch feeder fibre link so that the multiplexed signals are outputted on the protection feeder fibre link.

Figure 4:
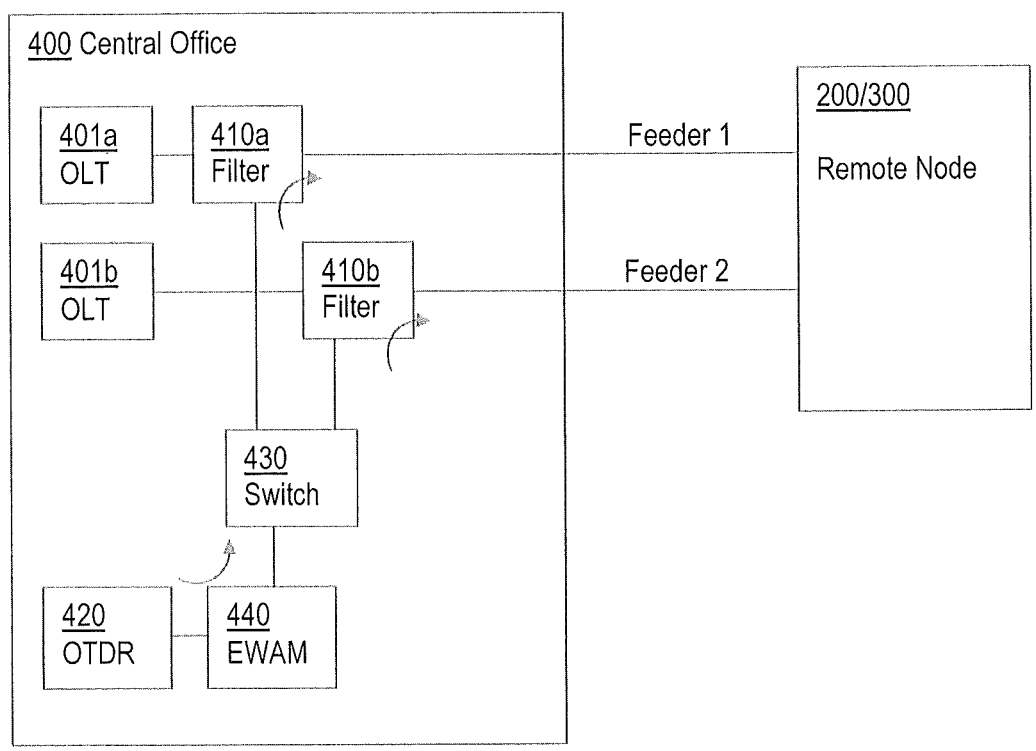
FIG. 4 is a block diagram of an exemplifying embodiment of a CO for supervision of the WDM-PON wherein the CO is connected to a RN by two individual feeder fibre links.

Starting with FIG. 4, the CO 400 is illustrated to comprise at least one OLT 401a, 401b adapted to output data signals. FIG. 4 further illustrates the CO 400 comprising an OTDR device 420 adapted to output OTDR signals. The CO 400 also comprises at least one filter 410a, 410b adapted to receive data signals from the OLT 401a, 401b and OTDR signals from the OTDR device 420 and to multiplex the signals together and output the multiplexed signals towards the working feeder fibre link towards the Remote Node 200, 300. The CO 400 further comprises a switch 430 which is adapted to receive OTDR signals from the OTDR device 420 and to direct the OTDR signals to the at least one filter 410a, 410b so that the at least one filter 410a, 410b is able to multiplex the OTDR signal with data signals from at least one OLT 401a, 401b.

Figure 5:
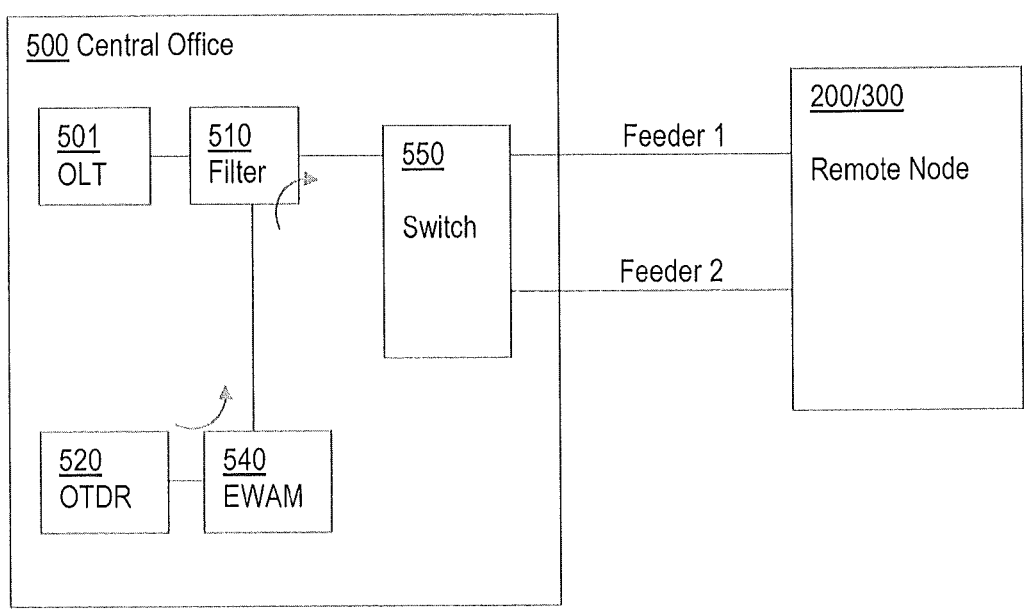
FIG. 5 is a block diagram of an exemplifying embodiment of a CO for supervision of the WDM-PON wherein the CO is connected to a RN by two individual feeder fibre links.

Looking at FIG. 5, the CO 500 is illustrated to comprise at least one OLT 501 adapted to output data signals. FIG. 5 further illustrates the CO 500 comprising an OTDR device 520 adapted to output OTDR signals. The CO 500 also comprises at least one filter 510 adapted to receive data signals from the OLT 501 and OTDR signals from the OTDR device 520 and to multiplex the signals together and output the multiplexed signals towards the working feeder fibre link towards the Remote Node 200, 300. The CO 500 further comprises a switch 550 which is adapted to receive multiplexed signals from the at least one filter 510 and to direct the received multiplexed signals to the RN 200, 300 on one of the feeder fibre links. In normal operation, the switch 550 transmits the received multiplexed signals to the RN 200, 300 on the working feeder fibre link and in case of a malfunction of the working feeder fibre link; the switch 550 transmits the received multiplexed signals to the RN 200, 300 on the protection feeder fibre link.

The OTDR device 420, 520 is in an example connected to a control unit (not shown). The control unit is adapted to analyse the back-scattered light from the drop link in order to detect any possible fault which has occurred in a drop link. The control unit may further be connected to the CO 400, 500 to control the switch 430, 550 and the at least one OLT 401a, 401b so that in case a malfunction of the working feeder fibre link is detected, the control unit controls the switch (and the OLTs in case of more than one) such that the protection feeder fibre link is used to transmit signals (data signals multiplexed with OTDR signals) to the RN 200, 300.

It shall be pointed out that the CO 400, 500 is illustrated comprising an External Wavelength Adaptation Module, EWAM, 430, 540. The EWAM 430, 540 is a module which receives the OTDR signal from the OTDR device 420, 520 and modulates the wavelength of the received OTDR signal. As described above, one specific wavelength of one OTDR signal may be used to supervise, or monitor, a plurality of ONTs, but possibly not all. In order to monitor all ONTs in the WDM-PON, several OTDR signals of different wavelengths may be needed. One way to generate OTDR signals of different wavelengths is by means of a tuneable OTDR device, T-OTDR. Another means for generating OTDR signals of different wavelengths is to employ an OTDR device capable of generating only one wavelength and combine such an OTDR device with an EWAM, wherein the different OTDR signals of different wavelengths are obtained by the OTDR device and the EWAM together.

The CO has the several advantages. The CO allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

According to an example, the CO 400 comprises a first and a second OLT 401a, 401b, a first and a second filter 410a, 410b and a switch 430. The switch 430 has an input connected to an output of the OTDR device 420 and is adapted to receive OTDR signals. The switch 430 further has two outputs, each connected to a respective filter 410a, 410b, wherein each respective filter 410a, 410b further is connected to a respective OLT 401a, 401b and a respective feeder fibre link and is adapted to receive data signals from the respective OLT 401a, 401b and OTDR signals from the OTDR device 420 and to multiplex the signals together and output the multiplexed signals on respective feeder fibre link.

In yet an example, when the CO 400 comprises a first and a second OLT 401a, 401b, the first OLT 401a is connected to the working fibre link by means of the first filter 410a, the first OLT 401a being a serving OLT and the second OLT 401b being a backup OLT, wherein upon detection of malfunction of the working feeder fibre link, the switching of feeder fibre links to the protection feeder fibre link comprises switching OLT such that the backup OLT 401b becomes the serving OLT.

Looking at FIG. 4, the CO 400 comprises two OLTs, a first 401a OLT and a second OLT 401b. The CO 400 further comprises two filters, a first filter 410a and a second filter 410b. The CO further comprises a switch 430. The switch 430 receives an OTDR signal from the OTDR, optionally via the EWAM 440, and depending on which feeder fibre link is the working feeder fibre link, the switch 430 forwards the received OTDR signal to one of the two filters 410a, 410b. In case Feeder 1 is the working feeder fibre, the switch 430 forwards the OTDR signal to the first filter 410a. If Feeder 1 is the working feeder fibre link, the first OLT 401a is a serving OLT. The filter 410a receives the OTDR signals from the switch 430 and data signals from the first OLT 401a. The first filter 410a multiplexes the received data signals and the OTDR signals together and transmits, or outputs, the multiplexed signals on the working feeder fibre link, Feeder 1, towards the RN 200, 300.

In case of a malfunction of the working feeder fibre link, Feeder 1, the switch 430 outputs the received OTDR signal to the second filter 410b. The second OLT 401b becomes the serving OLT, meaning that the first OLT 401a becomes a standby or back-up OLT. The standby OLT does not transmit any data signals, but may run in parallel to the serving OLT. The now serving OLT, i.e. the second OLT 401b transmits a data signal to the second filter 410b, which multiplexes the data signal and the OTDR signal together and outputs, or transmits, the multiplexed signal on the protection feeder fibre link, Feeder 2, towards the RN 200, 300.

In another example, the CO 500 comprises one OLT 501, one filter 510 and a switch 550, the switch 550 having an input connected to an output of the filter 510 and adapted to receive the multiplexed signals, the switch 550 further having two outputs each connected to a respective feeder fibre link.

In still an example, when the CO 500 comprises one OLT 501, one filter 510 and a switch 550, wherein the switch 550 in normal condition connects the output of the filter 510 to the working feeder fibre link, wherein upon detection of malfunction of the working feeder fibre link, the switching of feeder fibre links to the protection feeder fibre link comprises the switch 550 connecting the output of the filter 510 to the protection feeder fibre link.

Looking at FIG. 5, the CO 500 comprises one OLT 501 which is connected to one filter 510. The OLT 501 generates a data signal which the OLT transmits to the filter 510. The CO also comprises an OTDR device 520. The OTDR device generates an OTDR signal which the OTDR device 520 transmits to the filter 510. The filter 510 thus receives both the data signal and the OTDR signal which the filter 510 multiplexes together to a multiplexed signal which the filter 510 outputs, or transmits, to a switch 550. The switch 550 receives the multiplexed signal and outputs, or transmits, the multiplexed signal to the RN 200, 300 on one of the feeder fibre links, Feeder 1 or Feeder 2. For example, assume the Feeder 1 is the working feeder fibre link and the Feeder 2 is the protective feeder fibre link, then the switch 550 outputs, or transmits, the multiplexed signal to the RN 200, 300 on Feeder 1.

In case of a malfunction of the working feeder fibre link, Feeder 1, the switch 550 outputs, or transmits, the multiplexed signal to the RN 200, 300 on Feeder 2, i.e. the protection feeder fibre link. As described above, the CO 500 may comprise, or being connected to, a control unit (not shown), which will either detect the malfunction of the working feeder fibre link or receive a notification that a malfunction of the working feeder fibre has occurred. In such a case, the control unit will control the switch 550 to switch from outputting, or transmitting, a received multiplexed signal on the working feeder fibre link to the protection feeder fibre link.

In this manner, the operation of the feeder fibres connecting the CO 400, 500 and the RN 200, 300 are assured.

It shall be pointed out that the CO 400, 500 may be used together with any of the examples of the RN 200, 300 described above.

Embodiments herein also relate to a WDM-PON, comprising a CO 400, 500 according to any of the examples described above and a RN 200, 300 according to any of the examples described above, wherein the CO 400, 500 and the RN 200, 300 are connected via two individual feeder fibre links, one working feeder fibre link and one protection feeder fibre link, having different geographical paths between the CO 400, 500 and the RN 200, 300.

Figure 6:
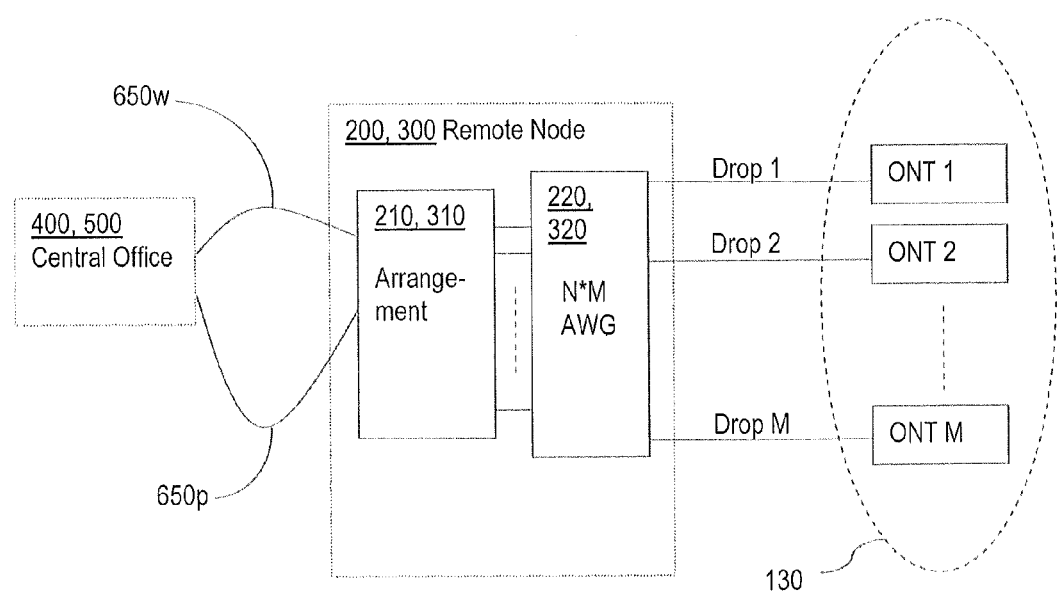
FIG. 6 is a schematic overview of an exemplifying embodiment of a WDM-PON comprising a CO and a RN connected by two individual feeder fibre links.

Looking at FIG. 6, a schematic overview of an exemplifying embodiment of a WDM-PON comprising a CO 400, 500 and a RN 200, 300 connected by two individual feeder fibre links is illustrated. FIG. 6 illustrates that the CO 400, 500 may be any of the examples described above of a CO being adapted to be connected to the RN 200, 300 by means of two feeder fibre links, one working feeder fibre link 650w and one protection feeder fibre link 650p. FIG. 6 further illustrates that the RN may be any of the examples described above of a RN being adapted to be connected to the CO 400, 500 by means of two feeder fibre links, one working feeder fibre link 650w and one protection feeder fibre link 650p. Further, FIG. 6 illustrates the CO 400, 500 being connected to the RN 200, 300 by means of two feeder fibre links, one working feeder fibre link 650w and one protection feeder fibre link 650p having different geographical paths between the CO 400, 500 and the RN 200, 300.

The WDM-PON has several advantages. The WDM-PON allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

Embodiments herein also relate to a method in an arrangement at a RN in a WDM-PON for supervision of the WDM-PON, wherein the RN is connected to a CO by two individual feeder fibre links. Such a method will now be described with reference to FIG. 7. The method has the same objectives, technical features and advantages as the arrangement described above. The method will be described in brief in order to avoid unnecessary repetition.

Figure 7:
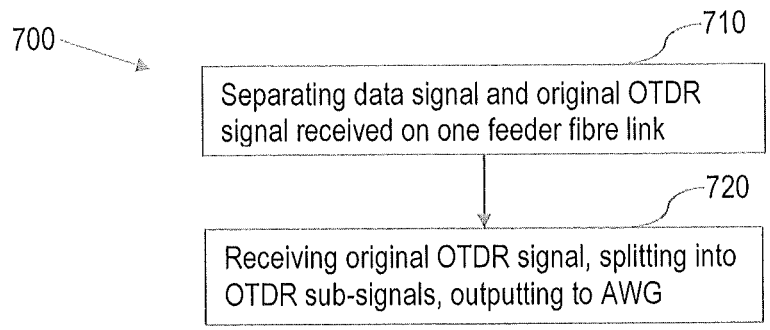
FIG. 7 is a flowchart of an exemplifying embodiment of a method in an arrangement at a remote node for supervision of a WDM-PON.

FIG. 7 is a flowchart of an exemplifying embodiment of a method in an arrangement at a remote node for supervision of a WDM-PON.

FIG. 7 illustrates the method 700 in an arrangement at a RN in a WDM-PON for supervision of the WDM-PON, wherein the RN is connected to a CO by two individual feeder fibre links comprising separating 710, in at least one filter connected to the feeder fibre links, a data signal and an original OTDR signal received on either of the feeder fibre links. The method 700 also comprises receiving 720 at a first splitter from the at least one filter, the original OTDR signal, and splitting the original OTDR signal into a plurality of OTDR sub-signals and outputting, to an N*M AWG the plurality of OTDR sub-signals. The at least one filter outputs the original OTDR signal to the first splitter and outputs the data signal to the AWG, thereby enabling supervision of the WDM-PON without influencing the data signals.

The method in the arrangement at the RN has several advantages, as described above. The method in the arrangement allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

In an example, the arrangement comprises one filter, wherein the method further comprises receiving, at a second splitter with two inputs connected to the two feeder fibre links, the data signal and the OTDR signal on either of the feeder fibre links and outputting the received data signal and the OTDR signal to the filter.

In yet an example, the received OTDR signal is splitted, in the first splitter, into N−1 OTDR sub-signals and the N−1 OTDR sub-signals are outputted on respective N−1 connections between the first splitter and the AWG.

In another example, the arrangement comprises two filters, wherein each of the two filters is connected to an individual respective feeder fibre link, wherein the method comprises receiving, at the first splitter, the original OTDR signal from either of the two filters and outputting N−2 QTDR sub-signals, to the N*M AWG.

According to an example, the data signal is outputted, from any of the two filters, on an individual and respective connection to the AWG.

In still an example, the received OTDR signal is splitted, in the first splitter to eight outputs of the first splitter.

Embodiment herein also relate to a method in a CO in a WDM-PON for supervision of the WDM-PON, wherein the CO is connected to a RN by two individual feeder fibre links, one working feeder fibre link and one protection feeder fibre link. Such a method will now be described with reference to FIG. 8. The method has the same objectives, technical features and advantages as the CO described above. The method will be described in brief in order to avoid unnecessary repetition.

Figure 8:
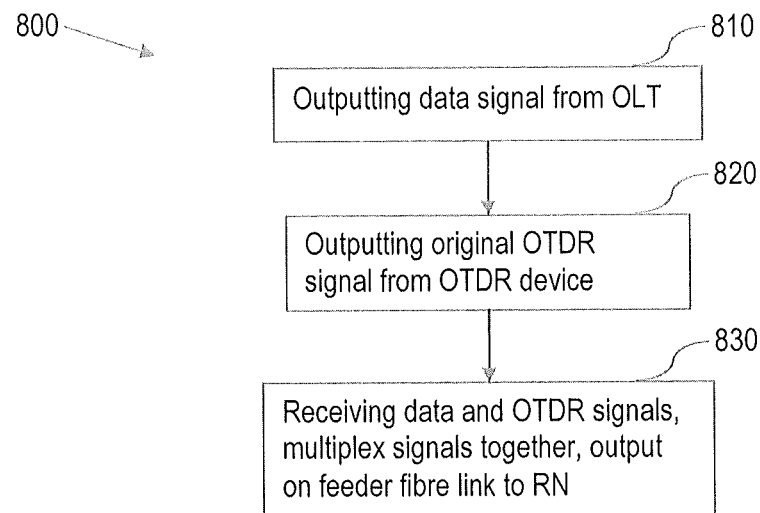
FIG. 8 is a flowchart of an exemplifying embodiment of a method in a CO for supervision of a WDM-PON.

FIG. 8 is a flowchart of an exemplifying embodiment of a method in a CO for supervision of a WDM-PON.

FIG. 8 illustrates the method 800 in the CO in a WDM-PON for supervision of the WDM-PON, wherein the CO is connected to a RN by two individual feeder fibre links, one working feeder fibre link and one protection feeder fibre link, comprising outputting 810 data signals from at least one OLT and outputting 820 OTDR signals from an OTDR device. The method further comprises receiving 830, in at least one filter, the data signals from the OLT and the OTDR signals from the OTDR device and to multiplexing the signals together and outputting the multiplexed signals to the working feeder fibre link towards the RN. A malfunction of the working feeder fibre link is detected at the OTDR device, wherein the Central Office switches feeder fibre link so that the multiplexed signals are outputted on the protection feeder fibre link.

The method in the CO has several advantages. The method allows for two individual feeder fibre links to be connected between the CO and the RN, thereby increasing the reliability of operation of the WDN-PON. The arrangement supports a totally passive Optical Distribution Network. The arrangement may be upgraded to any WDM-PON topology based on AWG. It is further standard compliant.

In an example, the Central Office comprises a first and a second OLT, a first and a second filter and a switch, the switch having an input connected to an output of the OTDR device and two outputs each connected to a respective filter, wherein each respective filter further is connected to a respective OLT and a respective feeder fibre link. The method comprises receiving the OTDR signals from the OTDR device at the switch and outputting the OTDR signals to one of the filters. The method further comprising receiving, at any of the respective filter, the OTDR signals from the switch and data signals from the respective OLT, the method further comprising multiplexing, at any of the respective filter, the signals together and outputting the multiplexed signals on respective feeder fibre link.

In yet an example, the first OLT is connected to the working fibre link by means of the first filter, the first OLT is a serving OLT and the second OLT is a backup OLT. The method comprises, when detecting a malfunction of the working feeder fibre link: switching feeder fibre links to the protection feeder fibre link by switching OLT such that the backup OLT becomes the serving OLT.

In still an example, the Central Office comprises one OLT, one filter and a switch, the switch having an input connected to an output of the filter and two outputs each connected to a respective feeder fibre link. The method comprises receiving the multiplexed signals at the switch and outputting the received multiplexed signal to one of the feeder fibre links.

According to an example, the method comprises connecting, at the switch, the output of the filter to the working feeder fibre link in normal operation, and upon detection of malfunction of the working feeder fibre link, switching of feeder fibre links to connect the output of the filter to the protection feeder fibre link.

The above described supervision of fibre links connecting the RN 200, 300 with ONTs may further be performed together with Optical Transceiver Monitoring, OTM, wherein measurable parameters are provided, which may be measured by the ONTs. The ONTs may then report the measurement results to the CO 400, 500. An example of a measurable parameter is transmitted/received power of signals sent between the OLT 401a, 401b, 501 in the CO 400, 500 and the ONTs.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. An arrangement at a Remote Node in a Wavelength Division Multiplexed Passive Optical Network (WDM-PON) configured for supervision of the WDM-PON, wherein the Remote Node is connected to a Central Office by two individual feeder fibre links, the arrangement comprising:
at least one filter connected to the feeder fibre links and configured to separate a data signal and an original Optical Time Domain Reflectometry (OTDR) signal received on either of the feeder fibre links; and
a first splitter configured to receive from the at least one filter the original OTDR signal, to split the original OTDR signal into a plurality of OTDR sub-signals, and to output to an N*M Arrayed Waveguide Grating (AWG) said plurality of OTDR sub-signals,
wherein N indicates a number of individual inputs and M indicates a number of individual outputs, and
wherein the at least one filter is further configured to output the original OTDR signal to the first splitter and to output the data signal to the N*M AWG, thereby enabling supervision of the WDM-PON without influencing the data signal.

2. An arrangement according to claim 1, wherein the at least one filter comprises one filter, the arrangement further comprising a second splitter with two inputs connected to said two feeder fibre links, respectively, for receiving the data signal and the OTDR signal on either of the feeder fibre links and an output for outputting the received data signal and the OTDR signal to the one filter.

3. An arrangement according to claim 2, wherein the first splitter is configured to split the received OTDR signal into N−1 OTDR sub-signals and to output the N−1 OTDR sub-signals to the N*M AWG on respective N−1 connections between the first splitter and the N*M AWG.

4. An arrangement according to claim 1,
wherein the at least one filter comprises two filters,
wherein each of the two filters is connected to a separate respective one of the two feeder fibre links, and
wherein the first splitter is further configured to receive the original OTDR signal from either of the two filters and to output N−2 OTDR sub-signals to the N*M AWG.

5. An arrangement according to claim 4, wherein each of the two filters is configured to output the data signal on an individual and respective connection to the N*M AWG.

6. An arrangement according to claim 1, wherein the first splitter is further configured to split the received OTDR signal to eight outputs of the first splitter.

7. A Remote Node in a Wavelength Division Multiplexed Passive Optical Network (WDM-PON) for supervision of the WDM-PON, wherein the Remote Node is connected to a Central Office by two individual feeder fibre links, the Remote Node comprising:
the arrangement according to claim 1, and
the N*M Arrayed Waveguide Grating (AWG),
wherein the N individual inputs of the N*M AWG are connected to the arrangement such that the output of each of the at least one filter is connected to a respective one of the N individual inputs of the N*M AWG and outputs of the first splitter are connected to the N individual inputs of the N*M AWG.

8. A Remote Node according to claim 7, wherein the at least one filter comprises one filter that has an output connected to one of the N individual inputs of the N*M AWG and the first splitter has N−1 outputs connected to respective ones of the N individual inputs of the N*M AWG.

9. A Remote Node according to claim 8 wherein N=9 and M=32.

10. A Remote Node according to claim 7,
wherein the at least one filter comprises two filters, each of which has a respective output connected to a respective input to the N*M AWG, and
wherein the first splitter has N−2 outputs, each of which is connected to a respective one of the N individual inputs of the N*M AWG.

11. A Remote Node according to claim 10 wherein N=10 and M=32.

12. A Central Office in a Wavelength Division Multiplexed Passive Optical Network (WDM-PON) for supervision of the WDM-PON, wherein the Central Office is connected to a Remote Node by two individual feeder fibre links, one of which comprises a working feeder fibre link and one of which comprises a protection feeder fibre link, the Central Office comprising:
at least one Optical Line Terminal (OLT) configured to output data signals;
an Optical Time Domain Reflectometry (OTDR) device configured to output OTDR signals; and
at least one filter configured to receive the data signals from the OLT and the OTDR signals from the OTDR device and to multiplex the data and OTDR signals together and output the multiplexed signals on the working feeder fibre link towards the Remote Node,
wherein the OTDR device is configured to detect a malfunction of the working feeder fibre link, wherein the Central Office is configured to switch feeder fibre links so that the multiplexed signals are output on the protection feeder fibre link,
wherein the at least one OLT comprises a first OLT and a second OLT,
wherein the at least one filter comprises a first filter and a second filter,
wherein the Central Office further comprises a switch, the switch having an input connected to an output of the OTDR device and configured to receive the OTDR signals, the switch further having two outputs, each of which is connected to a respective one of the first and second filters, and
wherein each of the respective first and second filters is further connected to a respective one of the first and second OLTs and a respective feeder fibre link and configured to receive the data signals from the respective one of the first and second OLTs and the OTDR signals from the OTDR device and to multiplex the data and OTDR signals together and output the multiplexed signals on a respective one of the working and protection feeder fibre links.

13. A Central Office according to claim 12,
wherein the first OLT is connected to the working feeder fibre link by the first filter, the first OLT comprising a serving OLT and the second OLT comprising a backup OLT, and
wherein upon detection of a malfunction of the working feeder fibre link, the switching of feeder fibre links to the protection feeder fibre link comprises switching OLTs such that the backup OLT becomes the serving OLT.

14. A Central Office according to claim 12,
wherein the at least one OLT comprises one OLT,
wherein the at least one filter comprises one filter, and
wherein the Central Office further comprises a switch, the switch having an input connected to an output of the one filter and configured to receive the multiplexed signals, the switch further having two outputs, each of which is connected to a respective one of the working and protection feeder fibre links.

15. A Central Office according to claim 14,
wherein the switch in normal condition connects the output of the one filter to the working feeder fibre link, wherein upon detection of a malfunction of the working feeder fibre link, the switching of feeder fibre links to the protection feeder fibre link comprises the switch connecting the output of the one filter to the protection feeder fibre link.

16. A Wavelength Division Multiplexed Passive Optical Network (WDM-PON) comprising the Central Office and the Remote Node according to claim 12, wherein the Central Office and the Remote Node are connected via the working feeder fibre link and the protection feeder fibre link, the working feeder fibre link and the protection feeder fibre link having different geographical paths between the Central Office and the Remote Node.

17. A method in an arrangement at a Remote Node in a Wavelength Division Multiplexed Passive Optical Network (WDM-PON) for supervision of the WDM-PON, wherein the Remote Node is connected to a Central Office by two individual feeder fibre links, the method comprising:
separating, in at least one filter connected to the feeder fibre links, a data signal and an original Optical Time Domain Reflectometry (OTDR) signal received on either of the feeder fibre links;
receiving at a first splitter, from the at least one filter, the original OTDR signal;
splitting the original OTDR signal into a plurality of OTDR sub-signals; and
outputting to an N*M Arrayed Waveguide Grating (AWG) said plurality of OTDR sub-signals,
wherein N indicates a number of individual inputs and M indicates a number of individual outputs, and
wherein the at least one filter outputs the original OTDR signal to the first splitter and outputs the data signal to the N*M AWG, thereby enabling supervision of the WDM-PON without influencing the data signal.

18. A method according to claim 17, wherein the at least one filter comprises one filter, the method further comprising receiving, at a second splitter with two inputs connected to said two feeder fibre links, the data signal and the OTDR signal on either of the feeder fibre links and outputting the received data signal and the OTDR signal to the one filter.

19. A method according to claim 17,
wherein the received OTDR signal is split, in the first splitter, into N−1 OTDR sub-signals, and
wherein the N−1 OTDR sub-signals are output on respective N−1 connections between the first splitter and the N*M AWG.

20. A method according to claim 17,
wherein the at least one filter comprises two filters,
wherein each of the two filters is connected to a separate one of the respective feeder fibre links, and
wherein the method further comprises receiving, at the first splitter, the original OTDR signal from either of the two filters and outputting N−2 OTDR sub-signals to the N*M AWG.

21. A method according to claim 20, wherein the data signal is output, from any of the two filters, on an individual and respective connection to the N*M AWG.

22. A method according to claim 17, wherein the received OTDR signal is split in the first splitter to eight outputs of the first splitter.

23. A method in a Central Office in a Wavelength Division Multiplexed Passive Optical Network (WDM-PON) for supervision of the WDM-PON, wherein the Central Office is connected to a Remote Node by two individual feeder fibre links, one of which comprises a working feeder fibre link and one of which comprises a protection feeder fibre link, the method comprising:
outputting data signals from at least one Optical Line Terminal (OLT);
outputting Optical Time Domain Reflectometry (OTDR) signals from an OTDR device;
receiving, in at least one filter, the data signals from the OLT and the OTDR signals from the OTDR device; and
multiplexing the data and OTDR signals together at the at least one filter and outputting the multiplexed signals to the working feeder fibre link towards the Remote Node,
wherein a malfunction of the working feeder fibre link is detected at the OTDR device,
wherein the Central Office switches feeder fibre links so that the multiplexed signals are output on the protection feeder fibre link,
wherein the at least one OLT comprises a first OLT and a second OLT,
wherein the at least one filter comprises a first and a second filter,
wherein the Central Office further comprises a switch, the switch having an input connected to an output of the OTDR device and two outputs, each of the two outputs connected to a respective filter,
wherein each of the respective first and second filters is further connected to a respective one of the first and second OLTs and a respective one of the working and protection feeder fibre links, and
wherein the method further comprises:
receiving the OTDR signals from the OTDR device at the switch;
outputting the OTDR signals to one of the first and second filters;
receiving, at any of the respective first and second filters, the OTDR signals from the switch and data signals from the respective one of the first and second OLTs; and
multiplexing, at any of the respective first and second filters, the data and OTDR signals together and outputting the multiplexed signals on a respective one of the working and protection feeder fibre links.

24. A method according to claim 23,
wherein the first OLT is connected to the working feeder fibre link by the first filter,
wherein the first OLT comprises a serving OLT and the second OLT comprises a backup OLT, and
wherein the method further comprises, upon detecting the malfunction of the working feeder fibre link, switching feeder fibre links to the protection feeder fibre link by switching OLTs such that the backup OLT becomes the serving OLT.

25. A method according to claim 23,
wherein the at least one OLT comprises one OLT,
wherein the at least one filter comprises one filter,
wherein the Central Office further comprises a switch, the switch having an input connected to an output of the one filter and two outputs, each of the two outputs connected to a respective one of the working and protection feeder fibre links, and
wherein the method further comprises receiving the multiplexed signals at the switch and outputting the received multiplexed signal to one of the working and protection feeder fibre links.

26. A method according to claim 25, further comprising:
connecting, at the switch, the output of the one filter to the working feeder fibre link in normal operation; and upon detection of the malfunction of the working feeder fibre link, switching the feeder fibre links to connect the output of the one filter to the protection feeder fibre link.

* * * * *

UNITED STATES PATENT AND TRADEMARK OFFICE
CERTIFICATE OF CORRECTION

PATENT NO.        : 9,020,349 B2                                                    Page 1 of 1
APPLICATION NO.   : 13/508006
DATED             : April 28, 2015
INVENTOR(S)       : Chen et al.

It is certified that error appears in the above-identified patent and that said Letters Patent is hereby corrected as shown below:

In the specification

In Column 4, Line 30, delete "FIG. 1a" and insert -- FIG. 1 --, therefor.

In Column 13, Line 42, delete "QTDR" and insert -- OTDR --, therefor.

Signed and Sealed this
Twenty-ninth Day of December, 2015

Michelle K. Lee
*Director of the United States Patent and Trademark Office*